UNITED STATES PATENT OFFICE 2,487,784

PROCESS OF PRODUCING AMINO CARBOXYLIC ACIDS

Morris J. Blish, Toledo, Ohio, assignor to International Minerals and Chemical Corporation, a corporation of New York No Drawing. Application November 1, 1946, Serial No. 707,340

10 Claims. (Cl. 260—529)

The present invention relates to the process of producing glutamic acid. More specifically, the process of the present invention relates to an improved procedure employed in the separation of the humin formed during the hydrolysis of the proteinaceous material from the hydrolysate so produced.

When the proteinaceous materials, such as wheat gluten, corn gluten or albumins, are hydrolyzed with mineral acid to produce amino carboxylic acids, considerable quantities of insoluble humin are formed. Since this material represents to a large extent degradation products of the hydrolysis, and since it serves no useful purpose in the ultimate isolation of amino acids, its separation from the resultant hydrolysate is conventionally carried out. The humin so separated is discarded from the process. By nature, however, this insoluble humin is non-crystalline or amorphous in character and is therefore often very difficult to separate from the hydrolysate by methods which are commonly employed. The principal method employed by the industry at the present time is by filtration, either by means of plate filter presses or the rotary type drum filters. Operating with these known types of equipment frequently causes a "bottleneck" in the production of amino carboxylic acids from hydrolyzed proteinaceous materials. The humin, once formed, is of a slimy consistency and even with the best filter aids on the market, its separation by filtration means is, to say the least, often difficult.

Because of the difficulty in separating humin from the hydrolysate, oftentimes the separation is not as complete as it should be and since humin is dark colored by nature, it often lends an off-color to the final amino carboxylic acids segregated.

It is an object of the invention to speed up the filtration of the hydrolysate for humin removal while at the same time employing the conventional filtering equipment heretofore employed by the industry.

It is a further object of the present invention to improve the process of producing amino carboxylic acids and to produce purer and less highly colored final products for sale to the industry.

These objects, as well as others which will become apparent upon a fuller understanding of the invention to be hereinafter described, are accomplished in a novel way.

It has been found that amino carboxylic acids produced by hydrolyzing proteinaceous materials with acid may be readily segregated from the insoluble humin and degradation products formed during the hydrolysis, if prior to the hydrolysis treatment a small amount of tannin or tannic acid is admixed with the composition to be hydrolyzed. The humin formed during the subsequent hydrolysis is readily filterable from the solution without any further precautions being taken to insure or increase the filterability of the precipitate so formed. As a result of this treatment with tannin or tannic acid, the amino carboxylic acids subsequently segregated as such or in the form of their acid addition salts or in the form of other alkali metal or alkaline earth metal salts are lighter in color than would otherwise be the case. The yields of amino carboxylic acids and the purities of these acids are both improved.

The amount of tannin or tannic acid added to the proteinaceous material which is contacted with acid may vary considerably. In order to realize the improved filtration and to attain a lighter colored filtrate it is not necessary to use large quantities of tannin or tannic acid though, if desired, such large quantities may be employed. In general, however, between about 0.5 and about 5.0% by weight of tannin or tannic acid based on the weight of the proteinaceous material hydrolyzed is employed, preferably between about 1.0 and about 2.0 weight percent of tannin or tannic acid is employed. Tannic acid, or its equivalent, in amounts less than 0.5% or greater than 5.0% may be employed but the advantages are more fully realized if the amount of tannic acid added lies within the range herein specified. It is not necessary but is desirable to pre-mix the tannic acid and the solid proteinaceous material and to add this mixture to the aqueous acidic hydrolyzing mix. If desired though, the tannic acid may be first added to the hydrolytic agent followed by the addition of the solid proteinaceous material thereto, or the proteinaceous material and the hydrolizing solution may be first mixed and the tannic acid added thereto.

This improved process is applicable to the hydrolysis of any proteinaceous material in which insoluble humin normally is formed in substantial amounts. Thus, the acidic hydrolysis of cotton seed meal, soybean meal, peanut meal, casein, albumin, the corn gluten, wheat gluten and the like, all produce substantial amounts of insoluble humin when subjected to acidic hydrolysis and the improved process is best used in such processes. Dilute solutions of hydrochloric acid, sulfuric acid, or any other suitable mineral non-oxidizing acids may be employed to effect the hydrolysis. In the actual hydrolysis, it has been found to be advantageous to expedite the reaction through the use of temperatures above room temperature and through the use of pressures above atmospheric pressure. Thus, for example, in the hydrolysis of wheat gluten temperatures of the order of from about 100 to 140° C. are employed. The conditions of hydrolysis are maintained for a period from about one and one-half to several hours, depending on the amount and concentration of acid employed. The tannic acid present during this hydrolysis is removed from the hydrolysate along with the humin and does not further contaminate the filtrate which contains the amino carboxylic acid or acids subsequently isolated.

The acid hydrolysate first is neutralized to a pH of between about 5.8 and about 6.8, preferably between about 6.0 and 6.5 and filtered. In the case of wheat gluten hydrolysis the filtrate is concentrated to a gravity of between 1.26 and 1.40, at 40° C., the mixture cooled to about room temperature, and the tyrosine and leucine precipitated therefrom. The slurry may be filtered immediately at this point to remove precipitated material then allowed to stand for further precipitation of unwanted substances followed by a second filtration or the first filtration can be omitted and the entire precipitate removed in one operation. The precipitate may be recovered by any conventional type of filtering apparatus and may be processed to separate the tyrosine and leucine and other solids from the filtrate. The filtrate from this filtering operation is then readjusted to a pH of about 3.2 for the separation by crystallization of glutamic acid. Usually hydrochloric acid or sulfuric acid are employed for this purpose and the glutamic acid may be crystallized by conventional methods. The recovered glutamic acid is of a high degree of purity that is of the order of 90 to 95% and the yield from the wheat gluten processed is between about 29 and about 31% based on protein treated.

The following specific examples are illustrative of the character of the invention but it is not intended that the invention be limited thereto.

EXAMPLES 400 grams of 26% hydrocloric acid at a temperature of about 50° C. had added thereto slowly with stirring, about 200 grams of wheat gluten (about 80% protein), which had previously been admixed with tannin as hereinbelow specified. This mixture was maintained at a temperature of between about 50 and about 75° C. until it became thin and free from lumps. The mixture then was hydrolyzed by heating the same under autogenous pressure in an autoclave for about three hours at about 120° C. The mixture was then cooled to about 40° C., removed from the autoclave, neutralized to a pH of about 6.0 to 6.5 by adding, with stirring, a 50% aqueous caustic soda solution, the temperature being maintained below 90° C. during the neutralization treatment. The neutralized hydrolysate was then maintained at a temperature of about 52 to 55° C. and filtered through canvas on a Buchner funnel. The humin cake was washed with three 25 cc. portions of water. Filtrate and washings were then concentrated to about 500 grams transferred to a suitable container and made up to about 530 grams with the water used to effect the quantitative transfer giving as a final concentration a specific gravity of about 1.35 at 40° C. After standing several hours, or overnight, the precipitate of tyrosine and leucine and other precipitated material was then filtered on a Buchner type filter and the precipitate was washed with two 20 cc. portions of cold water. The filtrate was then adjusted to a pH of about 3.2 with 37% aqueous hydrochloric acid and the glutamic acid was crystallized therefrom, filtered, washed with cold water, dried and weighed.

In the following table, comparative data are shown for the number of minutes required to filter the humin from the hydrolysates produced. Example 1 was conducted in the usual and conventional manner and no tannic acid was added to the material to be hydrolyzed. In each case where tannic acid was used, the humin cakes were bulky and porous in appearance and permitted rapid and thorough washing. The filtration times shown were measured as of the time for the humin to become sufficiently dry to crack and allow the passage of air through the cake. The runs were carried out on laboratory scale Buchner funnels using a new 8 ounce duck cloth for each run.

The subsequently isolated glutamic acid had at least as high a degree of purity in each instance and was recovered in at least as high a percentage yield as in those cases where no tannic acid, either in refined or crude form, was employed during the hydrolysis. In each instance any excess tannic acid was found to have been entirely taken up in the humin filter cake, and not the slightest trace of any adverse flavor or color could be detected in the glutamic acid subsequently isolated from the process.

| Example | Tannic Acid Added, Weight Per cent | Filtration Time (minutes) | | | |
|---|---|---|---|---|---|
| | | Series 1 | Series 2 | Series 3 | Series 4 |
| 1 | 0.0 | 22.0 | 24.0 | 28.0 | 24.0 |
| 2 | 0.5 | 4.5 | 8.0 | | |
| 3 | 1.0 | 4.0 | 4.0 | 3.0 | 6.0 |
| 4 | 2.0 | 3.0 | 3.0 | 2.0 | |

The product obtained in the above Examples 2, 3 and 4 was light colored and produced a crystallized, crude glutamic acid of improved color.

*Example 5*

A typical commercial scale operation of the process involving the herein described novel features was as follows: About 3400 lbs. of wheat gluten had admixed therewith about 34 lbs. of crude tannic acid. This mixture was then added to about 6800 lbs. of 26% aqueous hydrochloric acid and was maintained at about 120° C. under autogenous pressure for about two and one-half hours. After cooling to about 50° C., sufficient 50% aqueous sodium hydroxide was added to the hydrolysate to give a pH between about 6.0 and 6.4, and the mixture was then filtered at about 70° C., the residue being washed with a little hot water and the washings added to the filtrate for the further treatment in order to isolate glutamic acid. The humin cake which was filtered from the neutralized hydrolysate washed rapidly and without any difficulty whatsoever in the filter press in which it was formed and left a "dry" cake instead of the slimy or sloppy cake that is usually characteristic of poor filtrations heretofore encountered in attempting to satisfactorily segregate the humin formed from the solution containing the desired components. Whereas it formerly took about 140 minutes to filter humin from a batch of hydrolysate of this size and wherein there was no tannic acid added to the mixture undergoing hydrolysis, the above described commercial size batch of hydrolysate was efficiently and speedily filtered in about 30 minutes, representing a reduction in time of nearly two hours in the filtering operation herein described. Here again, as in Examples 2, 3 and 4, the glutamic acid subsequently isolated was of an improved color and without any sacrifice in the purity of the product or its yield as compared with previous commercial runs wherein no crude or pure tannic acid was employed in the hydrolysis step.

As used in this specification and accompanying claims the term humin or the term insoluble humin is intended to refer to precipitated humin conventionally produced by the acid hydrolysis of proteins and is not intended to include the soluble humin which is produced in these processes only in insignificant amounts.

Having now thus fully described and illustrated the character of the invention, what is desired to be secured and claimed by Letters Patent is:

1. The process which comprises hydrolyzing a proteinaceous substance with a mineral acid in the presence of tannic acid in an amount between about 0.5 and about 5.0% by weight of the proteinaceous substance treated and separating insoluble humin normally formed during the reaction from the solution.

2. The process which comprises hydrolyzing a proteinaceous substance with a non-oxidizing mineral acid in the presence of tannic acid in an amount between 0.5 and about 5.0% by weight of the proteinaceous substance treated and separating insoluble humin normally formed during the reaction from the solution.

3. The process which comprises hydrolyzing a proteinaceous substance with hydrochloric acid in the presence of tannic acid in an amount between 0.5 and 5.0% by weight of the proteinaceous substance treated and separating insoluble humin normally formed during the reaction from the solution.

4. The process which comprises hydrolyzing a proteinaceous substance with hydrochloric acid in the presence of tannic acid in an amount between 0.5 and 5.0% by weight of the proteinaceous substance treated, neutralizing the hydrolysate to a pH value between about 5.8 and about 6.8, and separating the insoluble humin normally formed during the reaction from the hydrolysate by filtration.

5. The process which comprises hydrolyzing a proteinaceous substance with hydrochloric acid in the presence of about 1% by weight of tannic acid based on the weight of the proteinaceous substance treated, neutralizing the hydrolysate with caustic soda to a pH value of between about 5.8 and 6.8 and separating the insoluble humin normally formed during the reaction from the hydrolysate by filtration.

6. A process as in claim 1 wherein the proteinaceous substance is wheat gluten and wherein the humin is separated from the hydrolysate by filtration.

7. A process as in claim 4 wherein the proteinaceous substance is wheat gluten and wherein the humin is separated from the hydrolysate by filtration.

8. In a process of hydrolyzing a proteinaceous substance with non-oxidizing mineral acid and wherein substantial amounts of difficultly filterable insoluble humin are normally formed during the hydrolysis, the improvement comprising preparing an admixture of proteinaceous substance and mineral acid for hydrolyzing, said admixture also containing between about 0.5 and about 5.0% by weight based on the proteinaceous substance of material added in the form of tannin, hydrolyzing the proteinaceous substance, and separating from the hydrolysate the insoluble humin formed therein.

9. In a process of hydrolyzing wheat gluten with hydrochloric acid and wherein substantial amounts of difficultly filterable insoluble humin are normally formed during the hydrolysis, the improvement comprising preparing an admixture of wheat gluten and hydrochloric acid for hydrolyzing, said admixture also containing between about 0.5 and about 5.0% by weight based on the wheat gluten of material added in the form of tannin, hydrolyzing the wheat gluten, and separating from the hydrolysate the insoluble humin formed therein.

10. A process which comprises forming an acid hydrolysate of a proteinaceous substance, said hydrolysate containing between about 0.5 and about 5.0% by weight based on the proteinaceous substance employed of a material originally added as tannin, and separating from the hydrolysate the insoluble humin formed therein.

MORRIS J. BLISH.

REFERENCES CITED

The following references are of record in the file of this patent:

UNITED STATES PATENTS

| Number | Name | Date |
| --- | --- | --- |
| 2,380,890 | Waters | July 31, 1945 |
| 2,405,574 | Gamma | Aug. 13, 1946 |

OTHER REFERENCES

Moeller, Journal of the Society of Chemical Industry (London), vol. 36, page 605, 1917.

Holm et al., Journal American Chemical Society, vol. 42, pp. 632–640 (1920).

Jones et al., "The Journal of Biological Chemistry," vol. 79, p. 439 (1928).

Kizel et al., Chemical Abstracts, vol. 35, col. 7427, 1941.